(12) United States Patent
Kuboki

(10) Patent No.: US 12,546,595 B2
(45) Date of Patent: Feb. 10, 2026

(54) FLOODING PREDICTION DEVICE, FLOODING PREDICTION SYSTEM, AND FLOODING PREDICTION METHOD

(71) Applicant: NEC Corporation, Tokyo (JP)

(72) Inventor: Shingo Kuboki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 385 days.

(21) Appl. No.: 18/275,564

(22) PCT Filed: Feb. 12, 2021

(86) PCT No.: PCT/JP2021/005283
§ 371 (c)(1),
(2) Date: Aug. 2, 2023

(87) PCT Pub. No.: WO2022/172405
PCT Pub. Date: Aug. 18, 2022

(65) Prior Publication Data
US 2024/0118077 A1    Apr. 11, 2024

(51) Int. Cl.
*G01C 13/00* (2006.01)

(52) U.S. Cl.
CPC ......... *G01C 13/008* (2013.01); *G01C 13/006* (2013.01)

(58) Field of Classification Search
CPC .... G01C 13/006; G01C 13/00; G01C 13/008; G01C 13/004; G01C 13/002; G01C 5/06; G01C 17/34; G01C 5/04; G01C 9/00; G01C 9/06; G01C 9/14; G01C 9/18; G01C 21/16; G01C 21/185; G01C 9/12

(Continued)

(56) References Cited

U.S. PATENT DOCUMENTS

2021/0018317 A1\* 1/2021 Noma .................. G01C 13/008

FOREIGN PATENT DOCUMENTS

| CN | 104460343 A | \* | 3/2015 |
| JP | 2002-256525 A | | 9/2002 |

(Continued)

OTHER PUBLICATIONS

JP Office Action for JP Application No. 2022-581119, mailed on Sep. 3, 2024 with English Translation.

(Continued)

*Primary Examiner* — Andre J Allen
(74) *Attorney, Agent, or Firm* — Sughrue Mion, PLLC

(57) ABSTRACT

The purpose of the present disclosure is to provide a flooding prediction device, etc. that make it possible to accurately predict the occurrence of flooding of a river. A flooding prediction device comprises: at least one processor configured to acquire measurement data indicating the result of measurement based on irradiation laser light emitted and radiated onto a measurement target region including the water surface part of a river, and reflection laser light reflected by the region and received by the coherent light sensing device, generate three-dimensional point group model of the measurement target region by using the measurement data, generate, by using the measurement data and the three-dimensional point group model, water surface state information indicating the state of the water surface part in the measurement target region, and predict the occurrence of flooding of the river by using the water surface state information.

20 Claims, 8 Drawing Sheets

(58) Field of Classification Search
USPC .......................................... 73/170.29
See application file for complete search history.

(56) References Cited

FOREIGN PATENT DOCUMENTS

| | | | | |
|---|---|---|---|---|
| JP | 2008-057994 | A | | 3/2008 |
| JP | 2008-082929 | A | | 4/2008 |
| JP | 2008-203123 | A | | 9/2008 |
| JP | 4221432 | B2 | * | 2/2009 |
| JP | 2009036776 | A | * | 2/2009 |
| JP | 4323565 | B1 | * | 9/2009 |
| JP | 2012247585 | A | * | 12/2012 |
| JP | 2014-190934 | A | | 10/2014 |
| JP | 2015-109058 | A | | 6/2015 |
| JP | 2016212000 | A | * | 12/2016 |
| JP | 2017-033432 | A | | 2/2017 |
| JP | 2018-004358 | A | | 1/2018 |
| JP | 2019-148482 | A | | 9/2019 |
| JP | 2021114102 | A | * | 8/2021 |
| JP | 7373974 | B2 | * | 11/2023 |
| JP | 2025016335 | A | * | 1/2025 |
| KR | 102853301 | B1 | * | 8/2025 ............. G08C 17/02 |

OTHER PUBLICATIONS

JP Decision of Dismissal of Amendment for JP Application No. 2022-581119, mailed on Feb. 4, 2025 with English Translation.
International Search Report for PCT Application No. PCT/JP2021/005283, mailed on May 11, 2021.
English translation of Written opinion for PCT Application No. PCT/JP2021/005283, mailed on May 11, 2021.

* cited by examiner

FLOODING PREDICTION DEVICE, FLOODING PREDICTION SYSTEM, AND FLOODING PREDICTION METHOD

TECHNICAL FIELD

This application is a National Stage Entry of PCT/JP2021/005283 filed on Feb. 12, 2021, the contents of all of which are incorporated herein by reference, in their entirety.

The present disclosure relates to a flooding prediction device and the like.

BACKGROUND ART

In recent years, a technique for measuring a water level in a river and the like by using a water level gauge has been known. Further, a technique for measuring a water level in a river and the like by using a visible light camera has also been known. The measured water level is used for, for example, prediction of occurrence of flooding in the river.

Note that a technique described in PTL 1 has been known as a related art. Further, a technique described in PTL 2 has also been known.

CITATION LIST

Patent Literature

PTL 1: Japanese Unexamined Patent Application Publication No. 2008-057994
PTL 2: Japanese Unexamined Patent Application Publication No. 2014-190934

SUMMARY OF INVENTION

Technical Problem

When a water level gauge is used, a water level to be measured may vary according to an installation position of the water level gauge, and the like. Thus, when occurrence of flooding is predicted based on a measured water level by using the water level gauge, there is a problem that it is difficult to accurately predict the occurrence of flooding.

Meanwhile, when a visible light camera is used, it may also be difficult to measure a water level depending on ambient brightness and the like. Thus, when occurrence of flooding is predicted based on a measured water level by using the visible light camera, there is a problem that it is difficult to accurately predict the occurrence of flooding.

In this way, in an example of using the water level gauge or the visible light camera, there is a problem that it is difficult to accurately predict occurrence of flooding.

The present disclosure has been made in order to solve the problem as described above, and an object of the present disclosure is to provide a flooding prediction device and the like that are able to accurately predict occurrence of flooding in a river.

Solution to Problem

One aspect of a flooding prediction device according to the present disclosure includes: a measurement data acquisition means for acquiring measurement data indicating a result of measurement based on applied laser light being emitted by a coherent light sensing device and being applied to a measurement target region including a water surface portion of a river, and reflected laser light being reflected by the measurement target region and being received by the coherent light sensing device; a three-dimensional point group model generation means for generating a three-dimensional point group model of the measurement target region by using the measurement data; a water surface state information generation means for generating water surface state information indicating a state of the water surface portion in the measurement target region by using the measurement data and the three-dimensional point group model; and a flooding prediction means for predicting occurrence of flooding in the river by using the water surface state information.

One aspect of a flooding prediction system according to the present disclosure includes: a measurement data acquisition means for acquiring measurement data indicating a result of measurement based on applied laser light being emitted by a coherent light sensing device and being applied to a measurement target region including a water surface portion of a river, and reflected laser light being reflected by the measurement target region and being received by the coherent light sensing device; a three-dimensional point group model generation means for generating a three-dimensional point group model of the measurement target region by using the measurement data; a water surface state information generation means for generating water surface state information indicating a state of the water surface portion in the measurement target region by using the measurement data and the three-dimensional point group model; and a flooding prediction means for predicting occurrence of flooding in the river by using the water surface state information.

One aspect of a flooding prediction method according to the present disclosure includes: acquiring, by a measurement data acquisition means, measurement data indicating a result of measurement based on applied laser light being emitted by a coherent light sensing device and being applied to a measurement target region including a water surface portion of a river, and reflected laser light being reflected by the measurement target region and being received by the coherent light sensing device; generating, by a three-dimensional point group model generation means, a three-dimensional point group model of the measurement target region by using the measurement data; generating, by a water surface state information generation means, water surface state information indicating a state of the water surface portion in the measurement target region by using the measurement data and the three-dimensional point group model; and predicting, by a flooding prediction means, occurrence of flooding in the river by using the water surface state information.

Advantageous Effects of Invention

According to the present disclosure, occurrence of flooding in a river is able to be accurately predicted.

EXAMPLE EMBODIMENT

Hereinafter, example embodiments of the present disclosure are described in detail with reference to accompanying drawings.

First Example Embodiment

Figure 1:
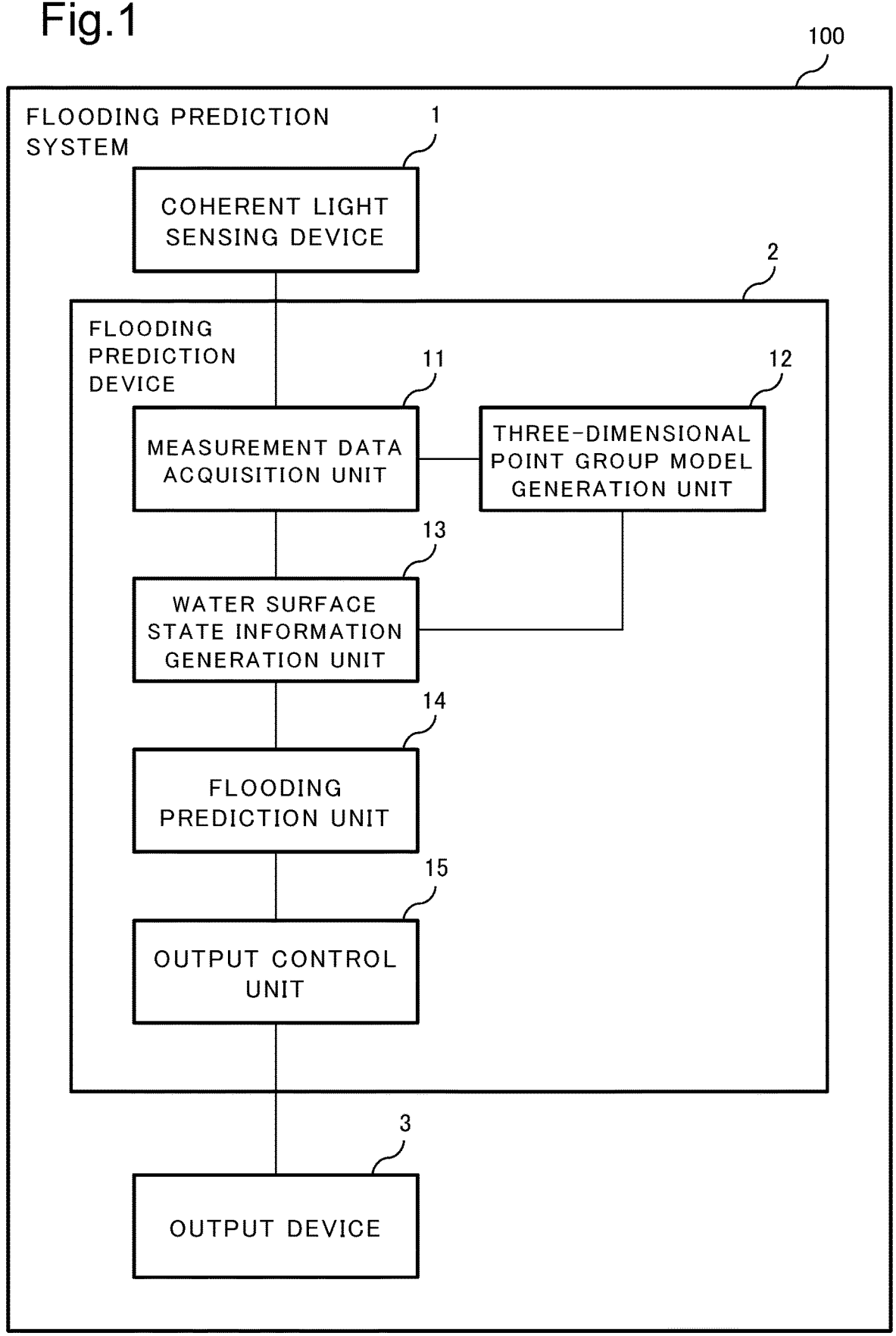
FIG. 1 is a block diagram illustrating a main unit of a flooding prediction system according to a first example embodiment.

FIG. 1 is a block diagram illustrating a main unit of a flooding prediction system according to a first example embodiment. The flooding prediction system according to the first example embodiment will be described with reference to FIG. 1.

As illustrated in FIG. 1, a flooding prediction system 100 includes a coherent light sensing device 1, a flooding prediction device 2, and an output device 3. The flooding prediction device 2 includes a measurement data acquisition unit 11, a three-dimensional point group model generation unit 12, a water surface state information generation unit 13, a flooding prediction unit 14, and an output control unit 15.

The coherent light sensing device 1 is installed at a predetermined point around a river. At this time, it is suitable that the coherent light sensing device 1 is fixedly installed at a high place (for example, on a bridge or a steel tower). Further, the coherent light sensing device 1 is installed toward a region (hereinafter referred to as a "measurement target region") partially including a portion (hereinafter referred to as a "water surface portion") corresponding to a water surface of a river and partially including a portion (hereinafter referred to as a "wall surface portion") corresponding to a wall surface of the river. The wall surface portion includes, for example, a wall surface of an embankment or a bank surface around the water surface portion. Further, the coherent light sensing device 1 is installed at a point within a predetermined distance from the measurement target region.

The coherent light sensing device 1 performs a measurement by light detection and ranging (LiDAR) in the installed state. The coherent light sensing device 1 outputs data (hereinafter referred to as "measurement data") indicating a result of an associated measurement.

In other words, the coherent light sensing device 1 emits laser light. The emitted laser light is applied to the measurement target region. The applied laser light is reflected by an object (including the water surface portion and the wall surface portion) in the measurement target region. The coherent light sensing device 1 receives the reflected laser light. Hereinafter, the laser light applied to the measurement target region may be referred to as "applied laser light". Further, the laser light reflected by the object in the measurement target region may be referred to as "reflected laser light".

Herein, an emission direction of the applied laser light is variable in the coherent light sensing device 1. The coherent light sensing device 1 successively emits the applied laser light in a plurality of directions. In this way, the applied laser light is emitted in each of the plurality of directions. In emission in each of the directions, data (hereinafter referred to as "distance data") indicating a one-way propagation distance corresponding to a round-trip propagation time of laser light and data (hereinafter referred to as "direction data") indicating an emission direction of the applied laser light are acquired. The measurement data output from the coherent light sensing device 1 include the distance data and the direction data.

Further, in emission in each of the directions, data (hereinafter referred to as "luminance data") indicating luminance of the reflected laser light are acquired. The data output from the coherent light sensing device 1 include the luminance data.

Further, in emission in each of the directions, data (hereinafter referred to as "frequency data") indicating a frequency component included in the reflected laser light are acquired. The measurement data output from the coherent light sensing device 1 include the frequency data.

Herein, a measurement by the coherent light sensing device 1 may be based on a principle of coherent LiDAR. In this case, the coherent light sensing device 1 has a frequency modulation function, a coherent detection function, and the like, and performs a measurement by a frequency-modulated continuous wave (FMCW) method. In other words, the coherent light sensing device 1 performs a measurement based on light interference (coherence). As compared to when a normal time of flight (ToF) method is used, a measurement of a long distance with high resolution can be achieved by using the FMCW method.

In addition, various known techniques can be used for a measurement by LiDAR. Detailed description of the techniques will be omitted.

The measurement data acquisition unit 11 acquires the measurement data output from the coherent light sensing device 1.

The three-dimensional point group model generation unit 12 generates, by using the measurement data acquired by the measurement data acquisition unit 11, a three-dimensional point group model corresponding to a surface shape of the measurement target region. In other words, the three-dimensional point group model generation unit 12 calculates, by using the distance data and the direction data included in the acquired measurement data, a coordinate value indicating a position of a point at which applied laser light being emitted in each direction is reflected. The coordinate value is a coordinate value in a virtual three-dimensional coordinate space. The three-dimensional point group model is generated by disposing a point corresponding to an individual coordinate value in the three-dimensional coordinate space.

In addition, various known techniques can be used for generation of a three-dimensional point group model, based on a result of a measurement by LiDAR. Detailed description of the techniques will be omitted.

The water surface state information generation unit 13 generates, by using the measurement data acquired by the measurement data acquisition unit 11 and the three-dimensional point group model generated by the three-dimensional point group model generation unit 12, information (hereinafter referred to as "water surface state information") indicating a state of the water surface portion in the measurement target region. Herein, the water surface state information includes information (hereinafter referred to as "water level information") indicating a water level in the measurement target region. Further, the water surface state information includes information (hereinafter referred to as "flow speed information") indicating a flow speed in the water surface portion in the measurement target region. A specific example of a generation method of the water surface state information will be described below.

The flooding prediction unit 14 predicts occurrence of flooding in a river by using the water surface state information generated by the water surface state information generation unit 13. In other words, the flooding prediction unit 14 determines, by using the generated water surface state information, presence or absence, or a degree of a possibility of occurrence of flooding. A specific example of a prediction method by the flooding prediction unit 14 will be described below.

The output control unit 15 performs control for outputting a notification according to a result of the prediction by the flooding prediction unit 14. The output device 3 is used for an output of the notification. The output device 3 includes, for example, at least one of a display device, a sound output device, and a communication device. The display device uses, for example, a display. The sound output device uses, for example, a speaker. The communication device uses, for example, a special transmitter and a special receiver.

Specifically, for example, when presence of occurrence of flooding is predicted by the flooding prediction unit 14, the output control unit 15 performs control for displaying an image for a notification (hereinafter referred to as a "notification image"). The display device of the output device 3 is used for display of the notification image. Alternatively, for example, when presence of occurrence of flooding is predicted by the flooding prediction unit 14, the output control unit 15 performs control for outputting a sound for a notification (hereinafter referred to as a "notification sound"). The sound output device of the output device 3 is used for an output of the notification sound. Alternatively, for example, when presence of occurrence of flooding is predicted by the flooding prediction unit 14, the output control unit 15 performs control for transmitting a signal for a notification (hereinafter referred to as a "notification signal"). The communication device of the output device 3 is used for transmission of the notification signal.

Herein, when presence of occurrence of flooding is predicted by the flooding prediction unit 14, the notification image may include information indicating that there is a possibility of the occurrence of the flooding. Further, when presence of occurrence of flooding is predicted by the flooding prediction unit 14, the notification image may include information for prompting a person in an area including a river to evacuate. Further, the notification sound may include the pieces of information. Further, the notification signal may include the pieces of information.

Further, the notification image may include the three-dimensional point group model generated by the three-dimensional point group model generation unit 12. In this way, a user of the flooding prediction system 100 can receive the notification as a matter of course, and can visually recognize a state of the water surface portion in the measurement target region.

Further, the notification sound may be output by a disaster prevention wireless speaker in an area including a river. In other words, the sound output device of the output device 3 may include the disaster prevention wireless speaker.

Further, the notification signal may be transmitted to a portable information terminal (for example, a smartphone) possessed by a person in an area including a river. By the portable information terminal, an image similar to the notification image may be displayed, or a sound similar to the notification sound may be output.

In this way, the main unit of the flooding prediction system 100 is formed.

Hereinafter, the measurement data acquisition unit 11 may be referred to as a "measurement data acquisition means". Further, the three-dimensional point group model generation unit 12 may be referred to as a "three-dimensional point group model generation means". Further, the water surface state information generation unit 13 may be referred to as a "water surface state information generation means". Further, the flooding prediction unit 14 may be referred to as a "flooding prediction means". Further, the output control unit 15 may be referred to as an "output control means".

Next, a hardware configuration of a main unit of the flooding prediction device 2 will be described with reference to FIGS. 2 to 4.

Figure 2:
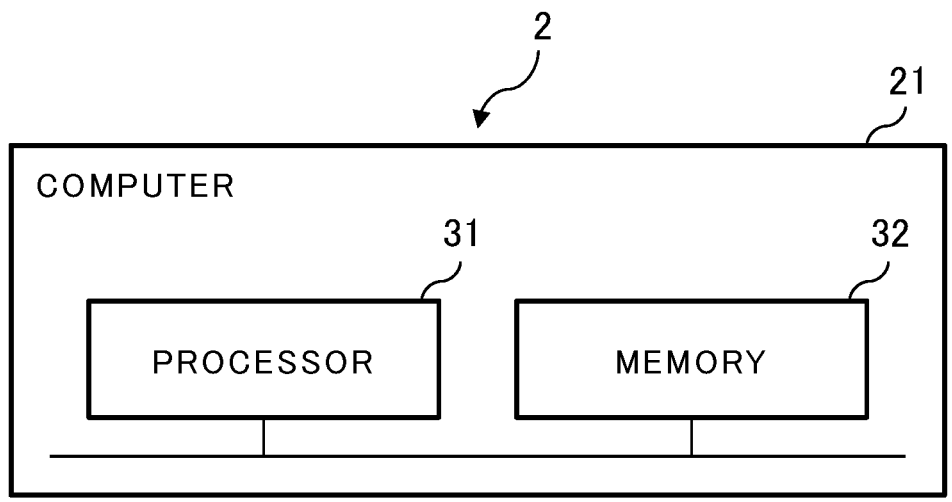
FIG. 2 is a block diagram illustrating a hardware configuration of a main unit of a flooding prediction device according to the first example embodiment.
Figure 3:
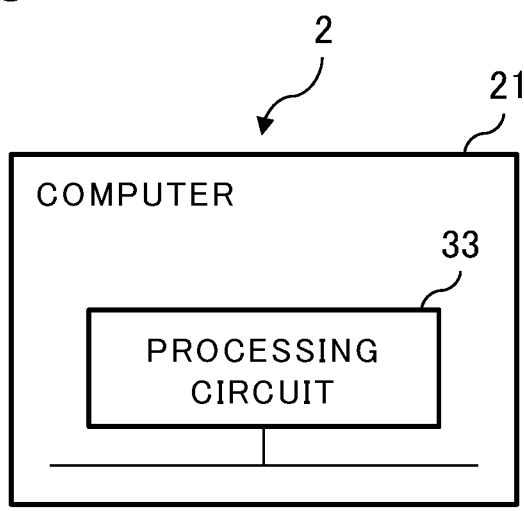
FIG. 3 is a block diagram illustrating another hardware configuration of the main unit of the flooding prediction device according to the first example embodiment.
Figure 4:
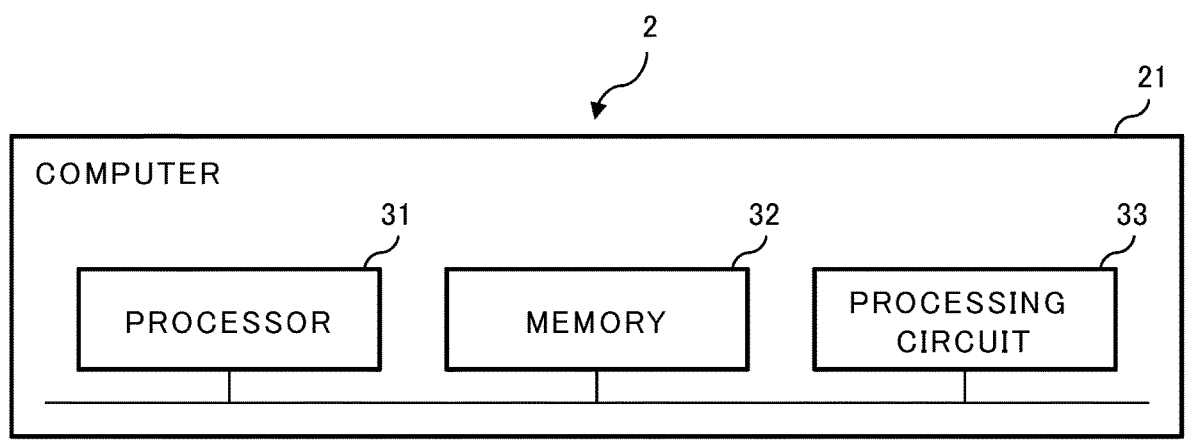
FIG. 4 is a block diagram illustrating another hardware configuration of the main unit of the flooding prediction device according to the first example embodiment.

As illustrated in each of FIGS. 2 to 4, the flooding prediction device 2 uses a computer 21. The computer 21 may be provided integrally with the coherent light sensing device 1. Alternatively, the computer 21 may be provided at another place (for example, in a cloud network). Alternatively, a part of elements of the computer 21 may be provided integrally with the coherent light sensing device 1, and remaining elements of the computer 21 may also be provided at another place.

As illustrated in FIG. 2, the computer 21 includes a processor 31 and a memory 32. The memory 32 stores a program for causing the computer 21 to function as the measurement data acquisition unit 11, the three-dimensional point group model generation unit 12, the water surface state information generation unit 13, the flooding prediction unit 14, and the output control unit 15. The processor 31 reads and executes the program stored in the memory 32. In this way, a function F1 of the measurement data acquisition unit 11, a function F2 of the three-dimensional point group model generation unit 12, a function F3 of the water surface state information generation unit 13, a function F4 of the flooding prediction unit 14, and a function F5 of the output control unit are achieved.

Alternatively, as illustrated in FIG. 3, the computer 21 includes a processing circuit 33. The processing circuit 33 performs processing for causing the computer 21 to function as the measurement data acquisition unit 11, the three-dimensional point group model generation unit 12, the water surface state information generation unit 13, the flooding prediction unit 14, and the output control unit 15. In this way, the functions F1 to F5 are achieved.

Alternatively, as illustrated in FIG. 4, the computer 21 includes the processor 31, the memory 32, and the processing circuit 33. In this case, a function of a part of the functions F1 to F5 is achieved by the processor 31 and the memory 32, and a remaining function of the functions F1 to F5 is also achieved by the processing circuit 33.

The processor 31 is formed of one or more processors. The individual processor uses, for example, a central processing unit (CPU), a graphics processing unit (GPU), a microprocessor, a microcontroller, or a digital signal processor (DSP).

The memory 32 is formed of one or more memories. The individual memory uses, for example, a random access memory (RAM), a read only memory (ROM), a flash memory, an erasable programmable read only memory (EPROM), an electrically erasable programmable read only memory (EEPROM), a solid state drive, a hard disk drive, a flexible disk, a compact disk, a digital versatile disc (DVD) a Blu-ray disk, a magneto optical (MO) disk, or a mini disk.

The processing circuit 33 is formed of one or more processing circuits. The individual processing circuit uses, for example, an application specific integrated circuit (ASIC), a programmable logic device (PLD), a field programmable gate array (FPGA), a system on a chip (SoC), or a system large scale integration (LSI).

Note that the processor 31 may include a special processor corresponding to each of the functions F1 to F5. The memory 32 may include a special memory corresponding to each of the functions F1 to F5. The processing circuit 33 may include a special processing circuit corresponding to each of the functions F1 to F5.

Figure 5:
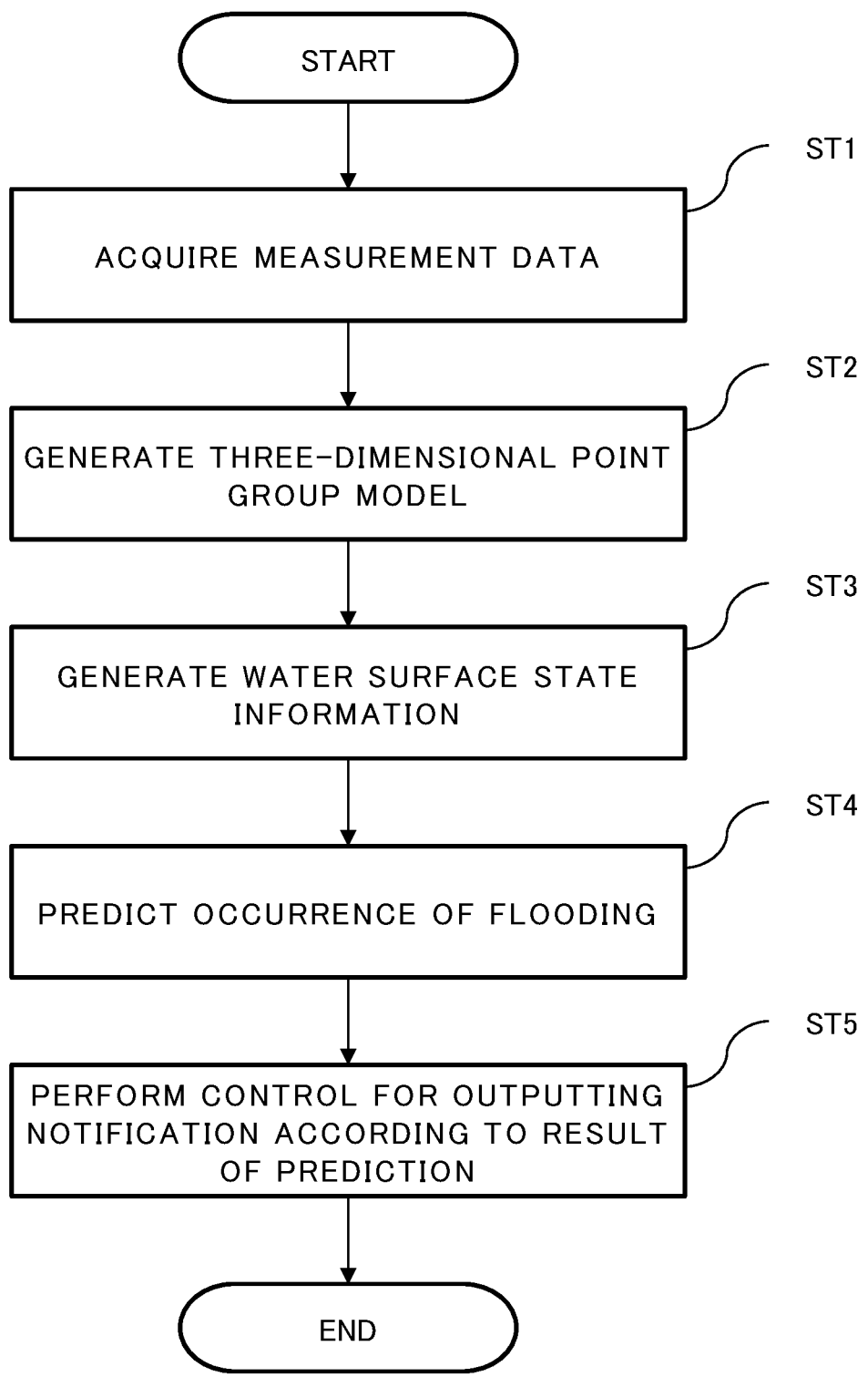
FIG. 5 is a flowchart illustrating an operation of the flooding prediction device according to the first example embodiment.

Next, an operation of the flooding prediction device 2 will be described with reference to a flowchart illustrated in FIG. 5.

First, the measurement data acquisition unit 11 acquires measurement data (step ST1).

Next, the three-dimensional point group model generation unit 12 generates a three-dimensional point group model in the measurement target region (step ST2). The measurement data acquired in step ST1 are used for the generation of the three-dimensional point group model.

Next, the water surface state information generation unit 13 generates water surface state information (step ST3). The measurement data acquired in step ST1 and the three-dimensional point group model generated in step ST2 are used for the generation of the water surface state information.

Next, the flooding prediction unit 14 predicts occurrence of flooding in a river (step ST4). The water surface state information generated in step ST3 is used for the prediction.

Next, the output control unit 15 performs control for outputting a notification according to a result of the prediction in step ST4 (step ST5). For example, when presence of occurrence of flooding is predicted in step ST4, the output control unit 15 performs control for outputting the notification.

Next, the specific example of the generation method of the water surface state information will be described.

First, a specific example of a generation method of water level information will be described.

A three-dimensional point group model generated by the three-dimensional point group model generation unit 12 is formed of a plurality of points. The individual point is corresponding to a point at which applied laser light being emitted in each direction is reflected. Meanwhile, luminance data included in the measurement data acquired by the measurement data acquisition unit 11 indicate luminance of reflected laser light corresponding to the applied laser light emitted in each direction. In other words, the luminance data indicate luminance corresponding to individual point in the three-dimensional point group model.

Herein, luminance of laser light reflected by the water surface portion is normally different from luminance of laser light reflected by the wall surface portion. A threshold value (hereinafter referred to as a "luminance threshold value") for identifying the luminance of laser light reflected by the water surface portion and the luminance of laser light reflected by the wall surface portion is set in the water surface state information generation unit 13.

The water surface state information generation unit 13 compares the luminance corresponding to the individual point in the three-dimensional point group model with the luminance threshold value. The water surface state information generation unit 13 determines, based on a result of the comparison, whether the individual point in the three-dimensional point group model is corresponding to the water surface portion or corresponding to the wall surface portion. In this way, the water surface state information generation unit 13 detects a portion corresponding to the water surface portion in the three-dimensional point group model, and also detects a portion corresponding to the wall surface portion in the three-dimensional point group model. The water surface state information generation unit 13 calculates a value (hereinafter referred to as a "water level value") indicating a water level in the measurement target region, based on a position of a boundary portion between the portions. The water surface state information generation unit 13 generates information including the calculated water level value, i.e., water level information. In this way, the water level information is generated.

For example, a table indicating a correspondence between the water level value and the position of the boundary portion is used for the calculation of the water level value. The table varies depending on an installation position, an installation direction, and the like of the coherent light sensing device 1. For example, the table is input to the flooding prediction device 2 by a provider or an administrator of the flooding prediction system 100 when the coherent light sensing device 1 is installed.

Secondly, a specific example of a generation method of flow speed information will be described.

As described above, when the water level information is generated, the portion corresponding to the water surface portion in the three-dimensional point group model is detected.

The frequency data included in the measurement data acquired by the measurement data acquisition unit 11 indicate a frequency component included in the reflected laser light corresponding to the applied laser light emitted in each direction. The water surface state information generation unit 13 calculates, by using the frequency data, a Doppler shift amount for the individual point included in the portion corresponding to the water surface portion in the three-dimensional point group model. In other words, the water surface state information generation unit 13 calculates a shift amount of a frequency of the reflected laser light with respect to a predetermined frequency (for example, a frequency of the applied laser light).

The water surface state information generation unit 13 calculates, by using the calculated Doppler shift amount, a value (hereinafter referred to as a "flow speed value") indicating a flow speed in the water surface portion in the measurement target region. The water surface state information generation unit 13 generates information including the calculated flow speed value, i.e., flow speed information. In this way, the flow speed information is generated.

Herein, various known techniques related to Doppler LiDAR can be used for calculation of a flow speed value, based on a Doppler shift amount. Detailed description of the techniques will be omitted.

Next, the specific example of the prediction method by the flooding prediction unit 14 will be described.

The flooding prediction unit 14 acquires information (hereinafter referred to as "reference state information") indicating a reference state of the water surface portion in the measurement target region. Herein, the reference state information includes a value (hereinafter referred to as a "water level reference value") indicating a water level in the measurement target region at a timing (for example, a timing at which the coherent light sensing device 1 is installed) being a reference. Further, the reference state information includes a value (hereinafter referred to as a "flow speed reference value") indicating a flow speed in the measurement target region at the timing (the same as the description above) being the reference.

For example, the reference state information is generated by the water surface state information generation unit 13, based on a result of a measurement by the coherent light sensing device 1 when the coherent light sensing device 1 is installed. Alternatively, for example, the reference state information is input to the flooding prediction device 2 by a provider or an administrator of the flooding prediction system 100 when the coherent light sensing device 1 is installed.

The flooding prediction unit 14 compares a water level value included in the water level information generated by the water surface state information generation unit 13 with the water level reference value included in the acquired reference state information described above. In this way, the flooding prediction unit 14 determines whether an increase amount (hereinafter referred to as a "water level increase amount") of the water level value with respect to the water level reference value exceeds a predetermined amount. When the water level increase amount exceeds the predetermined amount, the flooding prediction unit 14 determines that there is a possibility or a high possibility of occurrence of flooding at a point (hereinafter referred to as a "first prediction target point") corresponding to the measurement target region in a river. When the water level increase amount does not exceed the predetermined amount, the flooding prediction unit 14 determines that there is no possibility or a low possibility of occurrence of flooding at the first prediction target point.

Further, when the water level increase amount exceeds the predetermined amount, the flooding prediction unit 14 performs processing as follow.

In other words, the flooding prediction unit 14 compares a flow speed value included in the flow speed information generated by the water surface state information generation unit 13 with the flow speed reference value included in the acquired reference state information described above. In this way, the flooding prediction unit 14 determines whether an increase amount (hereinafter referred to as a "flow speed increase amount") of the flow speed value with respect to the flow speed reference value exceeds a predetermined amount. When the flow speed increase amount exceeds the predetermined amount, the flooding prediction unit 14 determines that there is a possibility or a high possibility of occurrence of flooding at a point (hereinafter referred to as a "second prediction target point") located downstream of the measurement target region in a river. When the flow speed increase amount does not exceed the predetermined amount, the flooding prediction unit 14 determines that there is no possibility or a low possibility of occurrence of flooding at the second prediction target point.

In other words, a state of a high water level in the measurement target region and a state of a high flow speed in the measurement target region are a state of a high flow rate in the measurement target region. In the state of the high flow rate in the measurement target region, there is a high probability that a water level at a point located downstream of the measurement target region increases. Thus, in this case, the flooding prediction unit 14 determines that there is a possibility or a high possibility of occurrence of flooding at the second prediction target point.

Next, an effect by using the flooding prediction system 100 will be described.

As described above, the flooding prediction system 100 uses the coherent light sensing device 1. By using the coherent light sensing device 1, a water level in the measurement target region can be detected with high accuracy. Occurrence of flooding at the first prediction target point can be predicted with high accuracy, based on a result of the detection with high accuracy. In other words, occurrence of flooding in a river can be accurately predicted.

Further, by using the coherent light sensing device 1, a water level in the measurement target region can be detected as a matter of course, and a flow speed in the measurement target region can be detected. In this way, occurrence of flooding at the point (i.e., the first prediction target point) corresponding to the measurement target region can be predicted as a matter of course, and occurrence of flooding at a point (for example, the second prediction target point) different from the first prediction target point can be predicted. In this way, occurrence of flooding at a plurality of different points in a river can be predicted. In other words, occurrence of flooding in a river can be accurately predicted.

Note that, when a water level gauge is used instead of the coherent light sensing device 1, a water level in the measurement target region can be detected, but a flow speed in the measurement target region cannot be detected. The same also applies to a case where a visible light camera is used (for example, see PTL 1). Further, the same also applies to a case where a three-dimensional laser scanner is used (for example, see a paragraph in PTL 2). In contrast, as described above, by using the coherent light sensing device 1, a flow speed in the measurement target region can be detected.

Further, when a visible light camera is used instead of the coherent light sensing device 1, it is difficult to detect a water level in the measurement target region according to ambient brightness (for example, during the night). In contrast, by using the coherent light sensing device 1, a water level in the measurement target region can be detected with high accuracy regardless of ambient brightness.

Modification Example 1

Next, a modification example of the flooding prediction system 100 will be described.

The water surface state information generation unit 13 may generate, for a plurality of points included in the measurement target region, water level information including a water level value corresponding to each of the plurality of points. The plurality of points may include, for example, a point corresponding to a right bank in a river and a point corresponding to a left bank in the river.

The water level information in this case includes a plurality of the water level values corresponding to the plurality of points. In this case, when the flooding prediction unit 14 predicts occurrence of flooding, the flooding prediction unit 14 may compare each of the plurality of water level values with a water level reference value, or may compare a statistic (for example, an average value) of the plurality of water level values with the water level reference value.

For example, the flooding prediction unit 14 determines, for a plurality of water level reference values corresponding to the plurality of points, whether an increase amount (i.e., a water level increase amount) of the associated water level value with respect to the individual water level reference value exceeds a predetermined amount. When the number of the water level increase amounts that exceed the predetermined amount is equal to or more than a predetermined number (for example, one), the flooding prediction unit 14 determines that there is a possibility or a high possibility of occurrence of flooding at the first prediction target point.

Alternatively, the flooding prediction unit 14 determines, for a statistic (for example, an average value) of the plurality of water level reference values corresponding to the plurality of points, whether an increase amount (i.e., a water level increase amount) of the statistic of the water level values with respect to the statistic of the water level reference values exceeds a predetermined amount. When the water level increase amount exceeds the predetermined amount, the flooding prediction unit 14 determines that there is a possibility or a high possibility of occurrence of flooding at the first prediction target point.

A water level may vary for each point in the measurement target region. In regard to this, an improvement in accuracy of prediction of occurrence of flooding at the first prediction target point can be achieved by using a result of a measurement at a plurality of points included in the measurement target region. In other words, occurrence of flooding in a river can be more accurately predicted.

Note that, when one water level gauge is used instead of the coherent light sensing device 1, a water level to be detected may vary depending on an installation position of the water level gauge. Thus, a problem occurs that it is difficult to accurately predict occurrence of flooding, based on the measured water level. In contrast, as described above, a result of a measurement at the plurality of points included in the measurement target region can be used by using the coherent light sensing device 1. As a result, occurrence of flooding in a river can be more accurately predicted.

Further, a flow speed may vary for each point in the measurement target region. For example, when a curve of a river is included in the measurement target region, a flow speed at a point corresponding to an inside of the curve may be different from a flow speed at a point corresponding to an outside of the curve. At this time, for a flow speed value, an average value in a region corresponding to the water surface portion of the measurement target region is calculated based on a principle of Doppler LiDAR. Thus, when the flooding prediction unit 14 predicts occurrence of flooding at the second prediction target point, the flooding prediction unit 14 compares the flow speed value with a flow speed reference value.

Modification Example 2

Next, another modification example of the flooding prediction system 100 will be described.

The flooding prediction system 100 may include a plurality of the coherent light sensing devices 1. For example, the flooding prediction system 100 may include a first coherent light sensing device 1 installed in a position corresponding to the first prediction target point, and a second coherent light sensing device 1 installed in a position corresponding to the second prediction target point.

In this case, the flooding prediction unit 14 may predict occurrence of flooding at the second prediction target point as follows.

In other words, the flooding prediction unit 14 compares a water level value based on a result of a measurement by the second coherent light sensing device 1 with a water level reference value corresponding to the second prediction target point. In this way, the flooding prediction unit 14 determines whether a water level increase amount at the second prediction target point exceeds a predetermined amount.

Further, the flooding prediction unit 14 compares a flow speed value based on a result of a measurement by the first coherent light sensing device 1 with a flow speed reference value corresponding to the first prediction target point. In this way, the flooding prediction unit 14 determines whether a flow speed increase amount at the first prediction target point exceeds a predetermined amount.

When the water level increase amount at the second prediction target point exceeds the predetermined amount and the flow speed increase amount at the first prediction target point exceeds the predetermined amount, the flooding prediction unit 14 determines that there is a possibility or a high possibility of occurrence of flooding at the second prediction target point. When the water level increase amount at the second prediction target point does not exceed the predetermined amount or the flow speed increase amount at the first prediction target point does not exceed the predetermined amount, the flooding prediction unit 14 determines that there is no possibility or a low possibility of occurrence of flooding at the second prediction target point.

Even in a state of a high flow rate at the first prediction target point, a water level at the second prediction target point may not rise due to a shape of a river, a width of the river, or the like. In such a case, a possibility of occurrence of flooding at the second prediction target point is conceivably low. Further, even in a state where a water level at the second prediction target point rises, when a flow rate at a point (for example, the first prediction target point) located upstream of the second prediction target point is small, a possibility of occurrence of flooding at the second prediction target point is conceivably low.

In regard to this, even in such a case, occurrence of flooding at the second prediction target point can be accurately predicted by using a flow speed at the first prediction target point and a water level at the second prediction target point in combination. In other words, occurrence of flooding in a river can be more accurately predicted.

Modification Example 3

Next, another modification example of the flooding prediction system 100 will be described.

The flooding prediction unit 14 may acquire information (hereinafter referred to as "water level fluctuation amount information") indicating a fluctuation amount of a water level in a river according to at least one of a season and a time period. For example, the water level fluctuation amount information is input to the flooding prediction device 2 by a provider or an administrator of the flooding prediction system 100 when the coherent light sensing device 1 is installed. When the flooding prediction unit 14 predicts occurrence of flooding, the flooding prediction unit 14 may use the acquired water level fluctuation amount.

In this case, the flooding prediction unit 14 may change a water level reference value according to a season including month and day (hereinafter referred to as "measurement month and day") when a measurement by the coherent light sensing device 1 is performed. Further, the flooding prediction unit 14 may change a water level reference value according to a time period including a time (hereinafter referred to as "measurement time") when a measurement by the coherent light sensing device 1 is performed.

Specifically, for example, the flooding prediction unit 14 determines whether the measurement time is a time included in a time period from a low tide to a high tide by using the water level fluctuation amount information. A fact that the measurement time is a time included in the time period is one of factors of a rise in a water level in the future. Thus, when the measurement time is determined as the time included in the time period, the flooding prediction unit 14 increases the water level reference value. Further, the flooding prediction unit 14 determines whether the measurement time is a time included in a time period from a high tide to a low tide by using the water level fluctuation amount information. A fact that the measurement time is a time included in the time period is one of factors of a decrease in a water level in the future. Thus, when the measurement time is the time included in the time period, the flooding prediction unit 14 lowers the water level reference value.

In this way, a decrease in accuracy of prediction due to a fluctuation of a water level according to a season or a time period can be suppressed by using the water level fluctuation amount information. As a result, occurrence of flooding in a river can be more accurately predicted.

Modification Example 4

Next, another modification example of the flooding prediction system 100 will be described with reference to FIG. 6.

Figure 6:
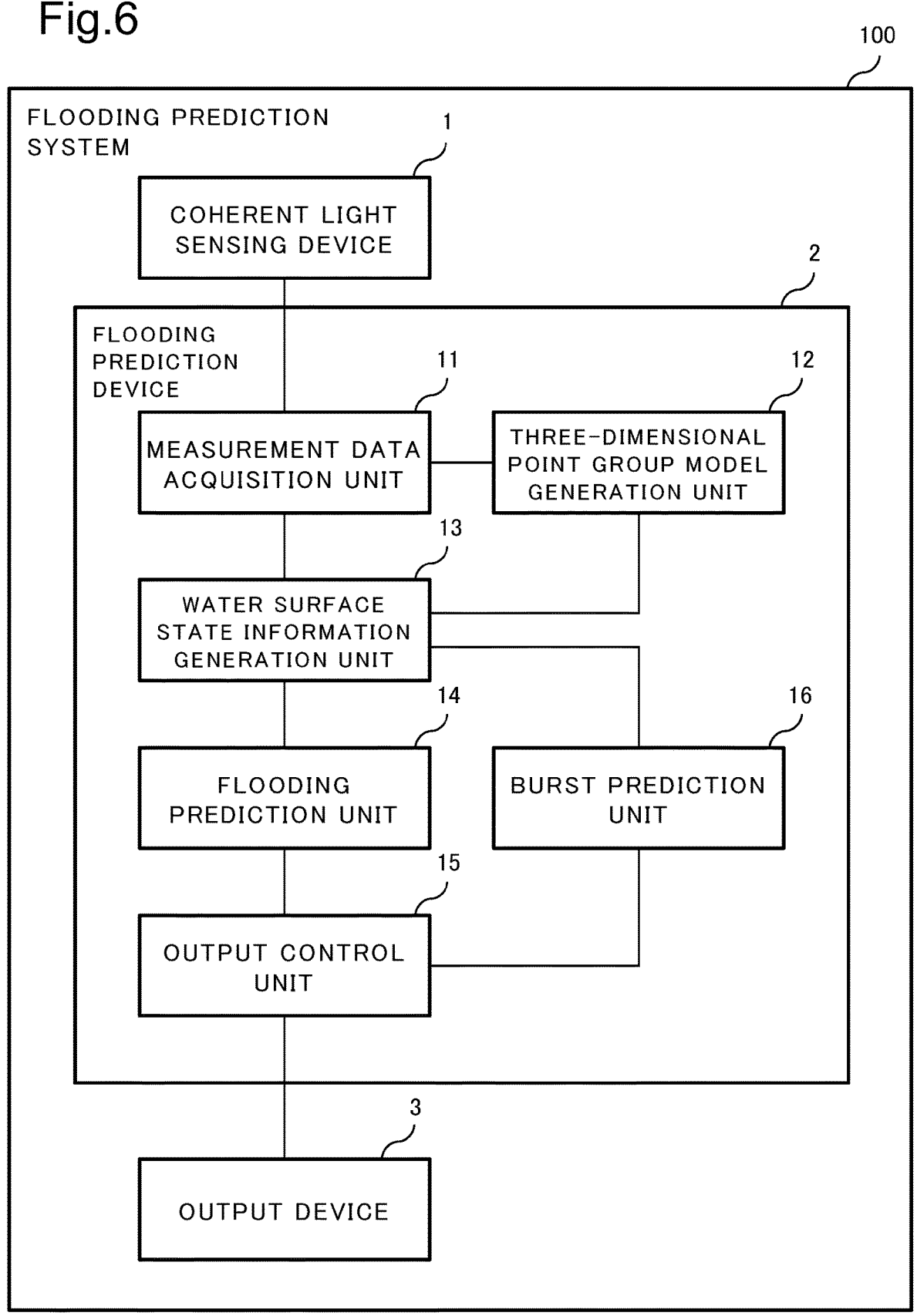
FIG. 6 is a block diagram illustrating a main unit of another flooding prediction system according to the first example embodiment.

As illustrated in FIG. 6, the flooding prediction device 2 may include a burst prediction unit 16. The burst prediction unit 16 predicts occurrence of a burst in a dam located downstream of a river by using the water surface state information generated by the water surface state information generation unit 13.

Specifically, for example, the burst prediction unit 16 predicts occurrence of a burst in a dam by a prediction method similar to the prediction method by the flooding prediction unit 14. In other words, when the burst prediction unit 16 detects, from the water surface state information, that a water level increase amount in a river exceeds a predetermined amount and a flow speed increase amount exceeds a predetermined amount, the burst prediction unit 16 determines that there is a possibility or a high possibility of the occurrence of the burst. In a case where a dam is provided downstream of a river, this is based on a high probability of occurrence of a burst in the dam when a flow rate in the river is high.

The output control unit 15 performs control for outputting a notification according to a result of the prediction by the burst prediction unit 16. The output device 3 is used for an output of the notification.

Herein, when presence of occurrence of a burst is predicted by the burst prediction unit 16, the notification may include information for prompting an adjustment of a degree of opening of a water gate provided upstream of the dam. Further, at this time, the notification may include information for prompting an adjustment of a water discharge amount in the dam.

In this way, the flooding prediction device 2 includes the burst prediction unit 16, and thus occurrence of flooding in a river can be accurately predicted as a matter of course, and occurrence of a burst in a dam can be predicted.

Hereinafter, the burst prediction unit 16 may be referred to as a "burst prediction means".

Modification Example 5

Next, another modification example of the flooding prediction system 100 will be described with reference to FIG. 7.

Figure 7:
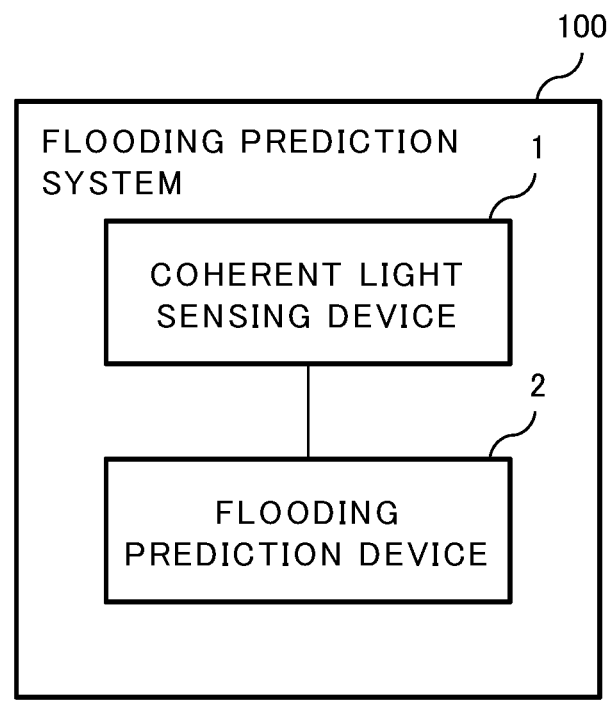
FIG. 7 is a block diagram illustrating a main unit of another flooding prediction system according to the first example embodiment.

As illustrated in FIG. 7, the flooding prediction system 100 may include the coherent light sensing device 1 and the flooding prediction device 2. In other words, the coherent light sensing device 1 and the flooding prediction device 2 may constitute a main unit of the flooding prediction system 100. In this case, the output device 3 may be provided outside the flooding prediction system 100.

Modification Example 6

Next, a modification example of the flooding prediction device 2 will be described with reference to FIG. 8. Further, another modification example of the flooding prediction system 100 will be described with reference to FIG. 9.

Figure 8:
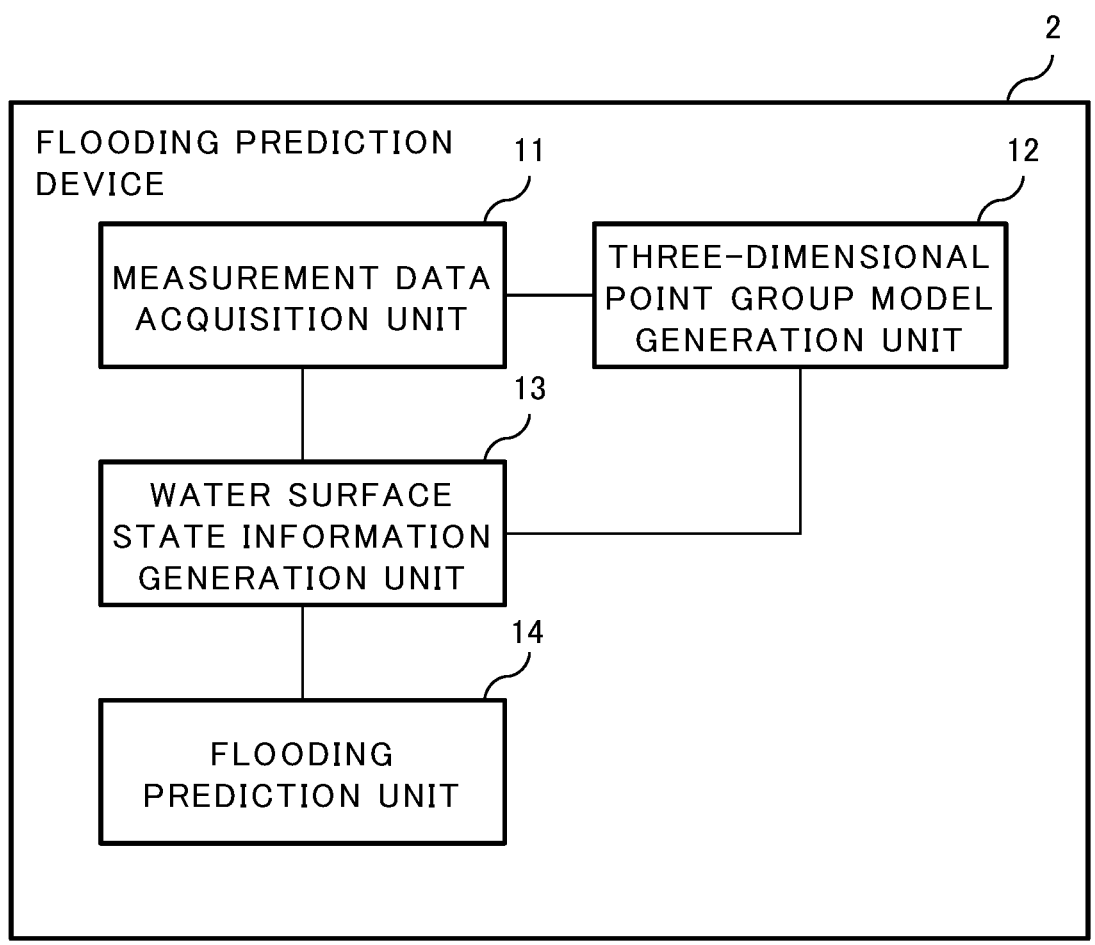
FIG. 8 is a block diagram illustrating a main unit of another flooding prediction device according to the first example embodiment.

As illustrated in FIG. 8, the flooding prediction device 2 may include the measurement data acquisition unit 11, the three-dimensional point group model generation unit 12, the water surface state information generation unit 13, and the flooding prediction unit 14. In other words, the measurement data acquisition unit 11, the three-dimensional point group model generation unit 12, the water surface state information generation unit 13, and the flooding prediction unit 14 may constitute a main unit of the flooding prediction device 2. In this case, the output control unit 15 may be provided outside the flooding prediction device 2.

Figure 9:
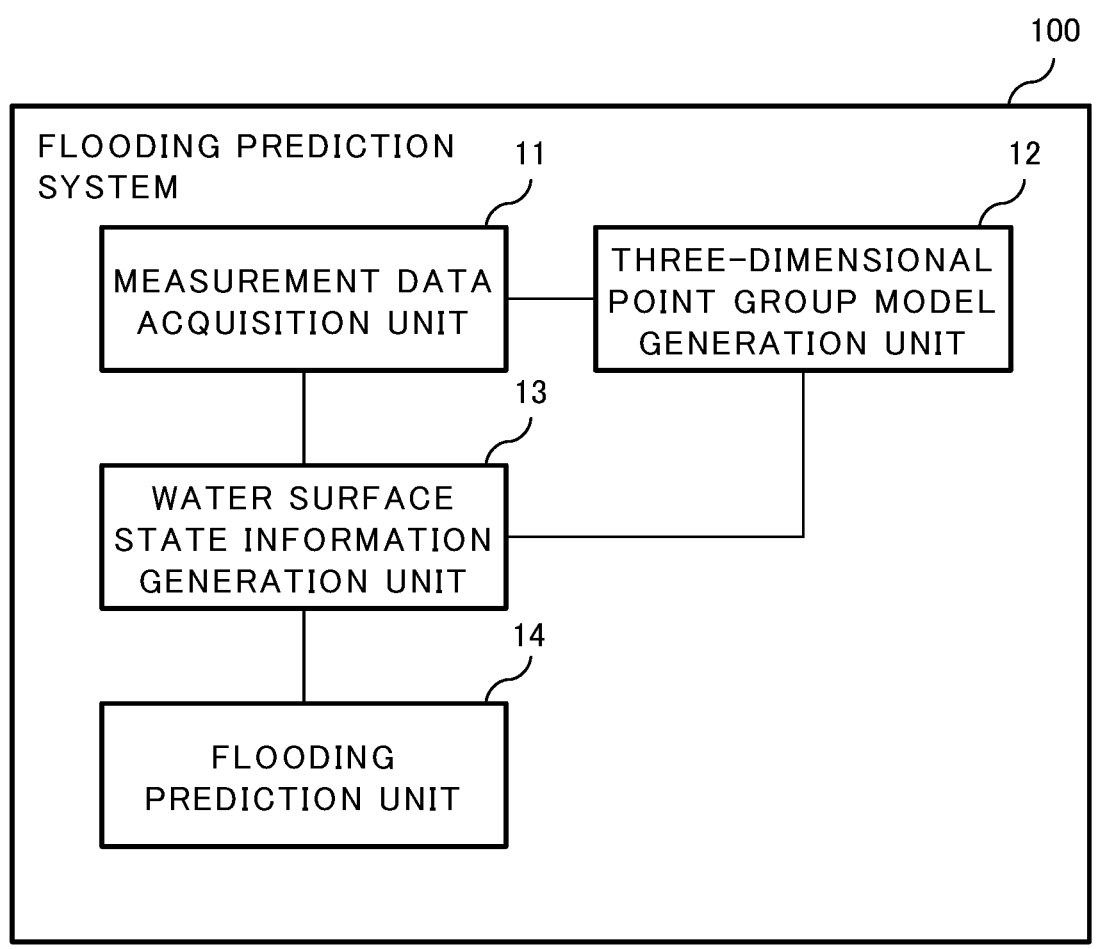
FIG. 9 is a block diagram illustrating a main unit of another flooding prediction system according to the first example embodiment.

As illustrated in FIG. 9, the flooding prediction system 100 may include the measurement data acquisition unit 11, the three-dimensional point group model generation unit 12, the water surface state information generation unit 13, and the flooding prediction unit 14. In other words, the measurement data acquisition unit 11, the three-dimensional point group model generation unit 12, the water surface state information generation unit 13, and the flooding prediction unit 14 may constitute a main unit of the flooding prediction system 100. In this case, the coherent light sensing device 1 may be provided outside the flooding prediction system 100. Further, the output control unit 15 may be provided outside the flooding prediction system 100. Further, the output device 3 may be provided outside the flooding prediction system 100.

Even in these cases, the effect as described above can be achieved. In other words, the measurement data acquisition unit 11 acquires measurement data. The measurement data indicate a result of a measurement based on applied laser light being emitted by the coherent light sensing device 1 and being applied to a measurement target region including a water surface portion of a river, and reflected laser light being reflected by the measurement target region and being received by the coherent light sensing device 1. The three-dimensional point group model generation unit 12 generates a three-dimensional point group model of the measurement target region by using the measurement data. The water surface state information generation unit 13 generates water surface state information indicating a state of the water surface portion in the measurement target region by using the measurement data and the three-dimensional point group model. The flooding prediction unit 14 predicts occurrence of flooding in the river by using the water surface state information. As described above, occurrence of flooding can be accurately predicted by using the coherent light sensing device 1. Particularly, as compared to when a water level gauge is used, when a visible light camera is used, or when a three-dimensional laser scanner is used, occurrence of flooding can be accurately predicted.

Note that each of the measurement data acquisition unit 11, the three-dimensional point group model generation unit 12, the water surface state information generation unit 13, and the flooding prediction unit 14 may be formed of an individual device in the flooding prediction system 100. Further, the devices may be geographically distributed and provided.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

A part or the whole of the example embodiments described above can be described as, but not limited to, the following supplementary notes.

Supplementary Note

Supplementary Note 1

A flooding prediction device including:
a measurement data acquisition means for acquiring measurement data indicating a result of measurement based on applied laser light being emitted by a coherent light sensing device and being applied to a measurement target region including a water surface portion of a river, and reflected laser light being reflected by the measurement target region and being received by the coherent light sensing device;
a three-dimensional point group model generation means for generating a three-dimensional point group model of the measurement target region by using the measurement data;
a water surface state information generation means for generating water surface state information indicating a state of the water surface portion in the measurement target region by using the measurement data and the three-dimensional point group model; and
a flooding prediction means for predicting occurrence of flooding in the river by using the water surface state information.

Supplementary Note 2

The flooding prediction device according to supplementary note 1, wherein
the measurement data include luminance data indicating luminance of the reflected laser light,
the water surface state information includes water level information indicating a water level in the measurement target region, and
the water surface state information generation means generates the water level information by detecting a portion corresponding to the water surface portion in the three-dimensional point group model by using the luminance data.

Supplementary Note 3

The flooding prediction device according to supplementary note 1 or 2, wherein
the flooding prediction means predicts occurrence of the flooding by using the water surface state information and reference state information indicating a reference state of the water surface portion in the measurement target region.

Supplementary Note 4

The flooding prediction device according to any one of supplementary notes 1 to 3, wherein,
when occurrence of the flooding is predicted by the flooding prediction means, a notification including information indicating that there is a possibility of occurrence of the flooding is output.

Supplementary Note 5

The flooding prediction device according to any one of supplementary notes 1 to 3, wherein,
when occurrence of the flooding is predicted by the flooding prediction means, a notification including information for prompting a person in an area including the river to evacuate is output.

Supplementary Note 6

The flooding prediction device according to any one of supplementary notes 1 to 5, further including
a burst prediction means for predicting occurrence of a burst in a dam located downstream of the river by using the water surface state information.

Supplementary Note 7

The flooding prediction device according to any one of supplementary notes 1 to 6, wherein
the flooding prediction means acquires water level fluctuation amount information indicating a water level fluctuation amount according to at least one of a season and a time period in the river, and uses the water level fluctuation amount information for prediction of occurrence of the flooding.

Supplementary Note 8

A flooding prediction system including:
a measurement data acquisition means for acquiring measurement data indicating a result of measurement based on applied laser light being emitted by a coherent light sensing device and being applied to a measurement target region including a water surface portion of a river, and reflected laser light being reflected by the measurement target region and being received by the coherent light sensing device;
a three-dimensional point group model generation means for generating a three-dimensional point group model of the measurement target region by using the measurement data;
a water surface state information generation means for generating water surface state information indicating a state of the water surface portion in the measurement target region by using the measurement data and the three-dimensional point group model; and
a flooding prediction means for predicting occurrence of flooding in the river by using the water surface state information.

Supplementary Note 9

The flooding prediction system according to supplementary note 8, wherein
the measurement data include luminance data indicating luminance of the reflected laser light,
the water surface state information includes water level information indicating a water level in the measurement target region, and the water surface state information generation means generates the water level information by detecting a portion corresponding to the water surface portion in the three-dimensional point group model by using the luminance data.

Supplementary Note 10

The flooding prediction system according to supplementary note 8 or 9, wherein
the flooding prediction means predicts occurrence of the flooding by using the water surface state information and reference state information indicating a reference state of the water surface portion in the measurement target region.

Supplementary Note 11

The flooding prediction system according to any one of supplementary notes 8 to 10, wherein,
when occurrence of the flooding is predicted by the flooding prediction means, a notification including information indicating that there is a possibility of occurrence of the flooding is output.

Supplementary Note 12

The flooding prediction system according to any one of supplementary notes 8 to 10, wherein,
when occurrence of the flooding is predicted by the flooding prediction means, a notification including information for prompting a person in an area including the river to evacuate is output.

Supplementary Note 13

The flooding prediction system according to any one of supplementary notes 8 to 12, further including
a burst prediction means for predicting occurrence of a burst in a dam located downstream of the river by using the water surface state information.

Supplementary Note 14

The flooding prediction system according to any one of supplementary notes 8 to 13, wherein
the flooding prediction means acquires water level fluctuation amount information indicating a water level fluctuation amount according to at least one of a season and a time period in the river, and uses the water level fluctuation amount information for prediction of occurrence of the flooding.

Supplementary Note 15

A flooding prediction method including
acquiring, by a measurement data acquisition means, measurement data indicating a result of measurement based on applied laser light being emitted by a coherent light sensing device and being applied to a measurement target region including a water surface portion of a river, and reflected laser light being reflected by the measurement target region and being received by the coherent light sensing device;
generating, by a three-dimensional point group model generation means, a three-dimensional point group model of the measurement target region by using the measurement data;
generating, by a water surface state information generation means, water surface state information indicating a state of the water surface portion in the measurement target region by using the measurement data and the three-dimensional point group model; and
predicting, by a flooding prediction means, occurrence of flooding in the river by using the water surface state information.

Supplementary Note 16

The flooding prediction method according to supplementary note 15, wherein
the measurement data include luminance data indicating luminance of the reflected laser light,
the water surface state information includes water level information indicating a water level in the measurement target region, and
the flooding prediction method further includes generating, by the water surface state information generation means, the water level information by detecting a portion corresponding to the water surface portion in the three-dimensional point group model by using the luminance data.

Supplementary Note 17

The flooding prediction method according to supplementary note 15 or 16, further including
predicting, by the flooding prediction means, occurrence of the flooding by using the water surface state information and reference state information indicating a reference state of the water surface portion in the measurement target region.

Supplementary Note 18

The flooding prediction method according to any one of supplementary notes 15 to 17, further including,
when occurrence of the flooding is predicted by the flooding prediction means, outputting a notification including information indicating that there is a possibility of occurrence of the flooding.

Supplementary Note 19

The flooding prediction method according to any one of supplementary notes 15 to 17, further including,
when occurrence of the flooding is predicted by the flooding prediction means, outputting a notification including information for prompting a person in an area including the river to evacuate.

Supplementary Note 20

The flooding prediction method according to any one of supplementary notes 15 to 19, further including
predicting, by a burst prediction means, occurrence of a burst in a dam located downstream of the river by using the water surface state information.

Supplementary Note 21

The flooding prediction method according to any one of supplementary notes 15 to 20, further including,
by the flooding prediction means, acquiring water level fluctuation amount information indicating a water level fluctuation amount according to at least one of a timing and a time period in the river, and using the water level fluctuation amount information for prediction of occurrence of the flooding.

Supplementary Note 22

A recording medium recording a program causing a computer to function as:
- a measurement data acquisition means for acquiring measurement data indicating a result of measurement based on applied laser light being emitted by a coherent light sensing device and being applied to a measurement target region including a water surface portion of a river, and reflected laser light being reflected by the measurement target region and being received by the coherent light sensing device;
- a three-dimensional point group model generation means for generating a three-dimensional point group model of the measurement target region by using the measurement data;
- a water surface state information generation means for generating water surface state information indicating a state of the water surface portion in the measurement target region by using the measurement data and the three-dimensional point group model; and
- a flooding prediction means for predicting occurrence of flooding in the river by using the water surface state information.

Supplementary Note 23

The recording medium according to supplementary note 22, wherein
the measurement data include luminance data indicating luminance of the reflected laser light,
the water surface state information includes water level information indicating a water level in the measurement target region, and
the water surface state information generation means generates the water level information by detecting a portion corresponding to the water surface portion in the three-dimensional point group model by using the luminance data.

Supplementary Note 24

The recording medium according to supplementary note 22 or 23, wherein
the flooding prediction means predicts occurrence of the flooding by using the water surface state information and reference state information indicating a reference state of the water surface portion in the measurement target region.

Supplementary Note 25

The recording medium according to any one of supplementary notes 22 to 24, wherein,
when occurrence of the flooding is predicted by the flooding prediction means, the program further causes the computer to function as an output control means for performing control for outputting a notification including information indicating that there is a possibility of occurrence of the flooding.

Supplementary Note 26

The recording medium according to any one of supplementary notes 22 to 24, wherein,
when occurrence of the flooding is predicted by the flooding prediction means, the program further causes the computer to function as an output control means for performing control for outputting a notification including information for prompting a person in an area including the river to evacuate.

Supplementary Note 27

The recording medium according to any one of supplementary notes 22 to 26, wherein
the program further causes the computer to function as a burst prediction means for predicting occurrence of a burst in a dam located downstream of the river by using the water surface state information.

Supplementary Note 28

The recording medium according to any one of supplementary notes 22 to 27, wherein
the flooding prediction means acquires water level fluctuation amount information indicating a water level fluctuation amount according to at least one of a timing and a time period in the river, and uses the water level fluctuation amount information for prediction of occurrence of the flooding.

REFERENCE SIGNS LIST

1 Coherent light sensing device
2 Flooding prediction device
3 Output device
11 Measurement data acquisition unit
12 Three-dimensional point group model generation unit
13 Water surface state information generation unit
14 Flooding prediction unit
15 Output control unit
16 Burst prediction unit
21 Computer
31 Processor
32 Memory
33 Processing circuit
100 Flooding prediction system

What is claimed is:

1. A flooding prediction device comprising:
at least one memory configured to store instructions; and
at least one processor configured to execute the instructions to
acquire measurement data indicating a result of measurement based on applied laser light being emitted by a coherent light sensing device and being applied to a measurement target region including a water surface portion of a river, and reflected laser light being reflected by the measurement target region and being received by the coherent light sensing device,
generate a three-dimensional point group model of the measurement target region by using the measurement data,
generate water surface state information indicating a state of the water surface portion in the measurement target region by using the measurement data and the three-dimensional point group model; and
predict occurrence of flooding in the river by using the water surface state information.

2. The flooding prediction device according to claim 1, wherein the measurement data include luminance data indicating luminance of the reflected laser light, the water surface state information includes water level information indicating a water level in the measurement target region, and the at least one processor generates the water level information by detecting a portion corresponding to the water surface portion in the three-dimensional point group model by using the luminance data.

3. The flooding prediction device according to claim 1, wherein the at least one processor predicts occurrence of the flooding by using the water surface state information and reference state information indicating a reference state of the water surface portion in the measurement target region.

4. The flooding prediction device according to claim 1, wherein, when occurrence of the flooding is predicted by the at least one processor, a notification including information indicating that there is a possibility of occurrence of the flooding is output.

5. The flooding prediction device according to claim 1, wherein, when occurrence of the flooding is predicted by the at least one processor, a notification including information for prompting a person in an area including the river to evacuate is output.

6. The flooding prediction device according to claim 1, wherein the at least one processor predicts occurrence of a burst in a dam located downstream of the river by using the water surface state information.

7. The flooding prediction device according to claim 1, wherein the at least one processor acquires water level fluctuation amount information indicating a water level fluctuation amount according to at least one of a season and a time period in the river, and uses the water level fluctuation amount information for prediction of occurrence of the flooding.

8. A flooding prediction system comprising:
at least one memory configured to store instructions; and
at least one processor configured to execute the instructions to
acquire measurement data indicating a result of measurement based on applied laser light being emitted by a coherent light sensing device and being applied to a measurement target region including a water surface portion of a river, and reflected laser light being reflected by the measurement target region and being received by the coherent light sensing device,
generate a three-dimensional point group model of the measurement target region by using the measurement data,
generate water surface state information indicating a state of the water surface portion in the measurement target region by using the measurement data and the three-dimensional point group model; and
predict occurrence of flooding in the river by using the water surface state information.

9. The flooding prediction system according to claim 8, wherein the measurement data include luminance data indicating luminance of the reflected laser light,
the water surface state information includes water level information indicating a water level in the measurement target region, and
the at least one processor generates the water level information by detecting a portion corresponding to the water surface portion in the three-dimensional point group model by using the luminance data.

10. The flooding prediction system according to claim 8, wherein the at least one processor predicts occurrence of the flooding by using the water surface state information and reference state information indicating a reference state of the water surface portion in the measurement target region.

11. The flooding prediction system according to claim 8, wherein, when occurrence of the flooding is predicted by the at least one processor, a notification including information indicating that there is a possibility of occurrence of the flooding is output.

12. The flooding prediction system according to claim 8, wherein, when occurrence of the flooding is predicted by the at least one processor, a notification including information for prompting a person in an area including the river to evacuate is output.

13. The flooding prediction system according to claim 8, wherein the at least one processor predicts occurrence of a burst in a dam located downstream of the river by using the water surface state information.

14. The flooding prediction system according to claim 8, wherein the at least one processor acquires water level fluctuation amount information indicating a water level fluctuation amount according to at least one of a season and a time period in the river, and uses the water level fluctuation amount information for prediction of occurrence of the flooding.

15. A flooding prediction method comprising:
acquiring, by at least one memory configured to store instructions; and at least one processor configured to execute the instructions, measurement data indicating a result of measurement based on applied laser light being emitted by a coherent light sensing device and being applied to a measurement target region including a water surface portion of a river, and reflected laser light being reflected by the measurement target region and being received by the coherent light sensing device;
generating, by the at least one processor, a three-dimensional point group model of the measurement target region by using the measurement data;
generating, by the at least one processor, water surface state information indicating a state of the water surface portion in the measurement target region by using the measurement data and the three-dimensional point group model; and
predicting, by the at least one processor, occurrence of flooding in the river by using the water surface state information.

16. The flooding prediction method according to claim 15, wherein the measurement data include luminance data indicating luminance of the reflected laser light,
the water surface state information includes water level information indicating a water level in the measurement target region, and
the flooding prediction method further comprises generating, by the at least one processor, the water level information by detecting a portion corresponding to the water surface portion in the three-dimensional point group model by using the luminance data.

17. The flooding prediction method according to claim 15, further comprising
predicting, by the at least one processor, occurrence of the flooding by using the water surface state information and reference state information indicating a reference state of the water surface portion in the measurement target region.

18. The flooding prediction method according to claim 15, further comprising, when occurrence of the flooding is predicted by the at least one processor, outputting a notification including information indicating that there is a possibility of occurrence of the flooding.

19. The flooding prediction method according to claim 15, further comprising,
when occurrence of the flooding is predicted by the at least one processor, outputting a notification including information for prompting a person in an area including the river to evacuate.

20. The flooding prediction method according to claim 15, further comprising
predicting, by the at least one processor, occurrence of a burst in a dam located downstream of the river by using the water surface state information.

* * * * *